(12) United States Patent
Sharkey

(10) Patent No.: US 8,308,213 B1
(45) Date of Patent: Nov. 13, 2012

(54) TRAILER WITH ADJUSTABLE INTERIOR SIZE AND ADJUSTABLE TRACK

(76) Inventor: Marvin B. Sharkey, Brandon, SD (US)

( * ) Notice: Subject to any disclaimer, the term of this patent is extended or adjusted under 35 U.S.C. 154(b) by 0 days.

(21) Appl. No.: 13/413,172

(22) Filed: Mar. 6, 2012

(51) Int. Cl.
*B60P 3/34* (2006.01)
(52) U.S. Cl. .................................................. 296/26.12
(58) Field of Classification Search ............... 296/26.12, 296/171, 175, 184.1, 204, 26.13; 105/171, 105/185; 280/149.2, 204, 414.1, 475, 492, 280/656; 224/521, 532, 557, 924
See application file for complete search history.

(56) References Cited

U.S. PATENT DOCUMENTS

| | | | |
|---|---|---|---|
| 3,830,522 A | 8/1974 | Boucher | |
| 4,077,643 A * | 3/1978 | Bates | 280/43.18 |
| 4,344,643 A * | 8/1982 | Ray | 280/124.109 |
| 4,511,174 A | 4/1985 | Walker | |
| 4,673,328 A * | 6/1987 | Shiels | 414/471 |
| 5,297,745 A * | 3/1994 | Vinyard | 241/101.763 |
| 5,474,416 A * | 12/1995 | Rogge et al. | 414/482 |
| 5,518,261 A * | 5/1996 | Godbersen | 280/414.1 |
| 5,536,131 A * | 7/1996 | Behr | 414/495 |
| 5,630,693 A * | 5/1997 | Sobina | 414/495 |
| 5,810,544 A * | 9/1998 | Wellman | 414/495 |
| 5,823,559 A * | 10/1998 | Priesgen et al. | 280/414.1 |
| 6,017,081 A | 1/2000 | Colby | |
| 6,113,130 A * | 9/2000 | Saulce | 280/656 |
| 6,119,882 A | 9/2000 | Crook | |
| 6,135,525 A * | 10/2000 | Amann | 296/26.11 |
| 6,425,591 B1 | 7/2002 | Ball | |
| 6,474,672 B1 * | 11/2002 | Briscese | 280/414.5 |
| 6,561,529 B2 | 5/2003 | Darling, III | |
| 6,592,139 B1 * | 7/2003 | Shanahan | 280/414.5 |
| 6,612,601 B1 * | 9/2003 | Granlind | 280/414.1 |
| 6,652,003 B2 | 11/2003 | Most | |
| 6,712,414 B2 * | 3/2004 | Morrow | 296/26.01 |
| 6,871,897 B1 * | 3/2005 | Snyder | 296/26.13 |
| 6,945,744 B1 | 9/2005 | Swanson | |
| 7,055,878 B2 | 6/2006 | Imhof | |
| 7,073,816 B1 * | 7/2006 | Larson et al. | 280/656 |
| 7,216,896 B1 * | 5/2007 | McGhie et al. | 280/789 |
| 7,243,979 B1 | 7/2007 | Stene | |
| 7,401,804 B1 * | 7/2008 | Rupp | 280/656 |
| 7,475,901 B2 * | 1/2009 | Winter et al. | 280/656 |
| 7,549,667 B2 * | 6/2009 | Busuttil et al. | 280/491.1 |
| 7,559,736 B1 * | 7/2009 | Mohan | 414/482 |
| 7,748,763 B2 * | 7/2010 | MacLean | 296/26.13 |
| 7,770,913 B2 * | 8/2010 | Cannon | 280/656 |
| 7,810,590 B1 * | 10/2010 | Bellis, Jr. | 180/16 |
| 7,810,834 B2 * | 10/2010 | Schneider et al. | 280/656 |
| 7,950,675 B1 * | 5/2011 | Quenzi et al. | 280/6.157 |

(Continued)

*Primary Examiner* — Kiran B Patel
(74) *Attorney, Agent, or Firm* — Jeffrey A. Proehl; Woods, Fuller, Shultz & Smith, P.C.

(57) ABSTRACT

An enclosed trailer may comprise an enclosure having an interior defined by at least two lateral enclosure portions. The lateral enclosure portions are laterally movable between a contracted condition with a smaller interior volume and an expanded condition with a larger interior volume. The trailer may comprise a support frame including two lateral frame portions laterally movable between a contracted condition corresponding to the contracted condition of the lateral enclosure portions and an expanded condition corresponding to the expanded condition of the lateral enclosure portions. The trailer may further include a frame movement assembly configured to move the lateral frame portions between the expanded and contracted conditions, and a pair of wheels with each wheel being mounted on one lateral frame portion such that the wheels move laterally inward and outward with the frame portions as the frame portions move between the contracted and expanded conditions.

19 Claims, 5 Drawing Sheets

U.S. PATENT DOCUMENTS

| | | | |
|---|---|---|---|
| 8,016,316 B1 * | 9/2011 | Carlton | 280/656 |
| 2004/0184903 A1 * | 9/2004 | Neider | 414/495 |
| 2006/0012145 A1 * | 1/2006 | Gardner | 280/124.128 |
| 2006/0022477 A1 | 2/2006 | Imhof | |
| 2006/0145499 A1 * | 7/2006 | Boon | 296/26.14 |
| 2006/0186643 A1 * | 8/2006 | LaBore | 280/656 |
| 2006/0284397 A1 * | 12/2006 | Lambert | 280/491.1 |

* cited by examiner

TRAILER WITH ADJUSTABLE INTERIOR SIZE AND ADJUSTABLE TRACK

BACKGROUND

Field

The present disclosure relates to trailers and more particularly pertains to a new trailer with adjustable interior size and adjustable track for facilitating movement of the trailer between sites where the trailer is to be used, for example, as an ice fishing shack.

SUMMARY

In one aspect, the present disclosure relates to an enclosed trailer having a front and a rear, and the trailer may comprise an enclosure having an interior at least partially defined by at least two lateral enclosure portions. The lateral enclosure portions may be laterally movable between a contracted condition with a relatively smaller interior volume and an expanded condition with a relatively larger interior volume. The trailer may also comprise a support frame including at least two lateral frame portions, with the lateral frame portions being laterally movable between a contracted condition and an expanded condition. The contracted condition of the lateral frame portions may correspond to the contracted condition of the lateral enclosure portions and the expanded condition of the lateral frame portions may correspond to the expanded condition of the lateral enclosure portions. The trailer may also comprise a frame movement assembly configured to move the lateral frame portions of the support frame between the expanded and contracted conditions, with the frame movement assembly including a pair of laterally extendable and retractable axle members. The trailer may also include a pair of wheels with each of the wheels being mounted on one of the axle members such that the wheels move laterally inward and outward with the frame portions as the frame portions are moved laterally inward and outward between the contracted and expanded conditions by the frame movement assembly.

In another aspect, the disclosure relates to an enclosed trailer having a front and a rear, and the trailer may comprise an enclosure having an interior at least partially defined by a central enclosure portion and at least two lateral enclosure portions that are laterally movable outwardly with respect to the central enclosure portion. The lateral enclosure portions may be laterally movable between a contracted condition with a relatively smaller interior volume and an expanded condition with a relatively larger interior volume. The trailer may further comprise a support frame including a central frame portion and at least two lateral frame portions laterally movable outwardly from the central frame portion. The lateral frame portions may be movable between a contracted condition and an expanded condition, with the contracted condition of the lateral frame portions corresponding to the contracted condition of the lateral enclosure portions and the expanded condition of the lateral frame portions corresponding to the expanded condition of the lateral enclosure portions. The trailer may also comprise a frame movement assembly configured to move the lateral frame portions of the support frame between the expanded and contracted conditions, with the frame movement assembly including a pair of laterally extendable and retractable axle members. The trailer may also include a pair of wheels with each of the wheels being mounted on one of the axle members such that the wheels are moved laterally inward and outward with the frame portions as the frame portions move laterally inward and outward between the contracted and expanded conditions. The trailer may also comprise a wheel movement assembly configured to adjust a spacing between the support frame and a ground surface on which the wheels rest.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
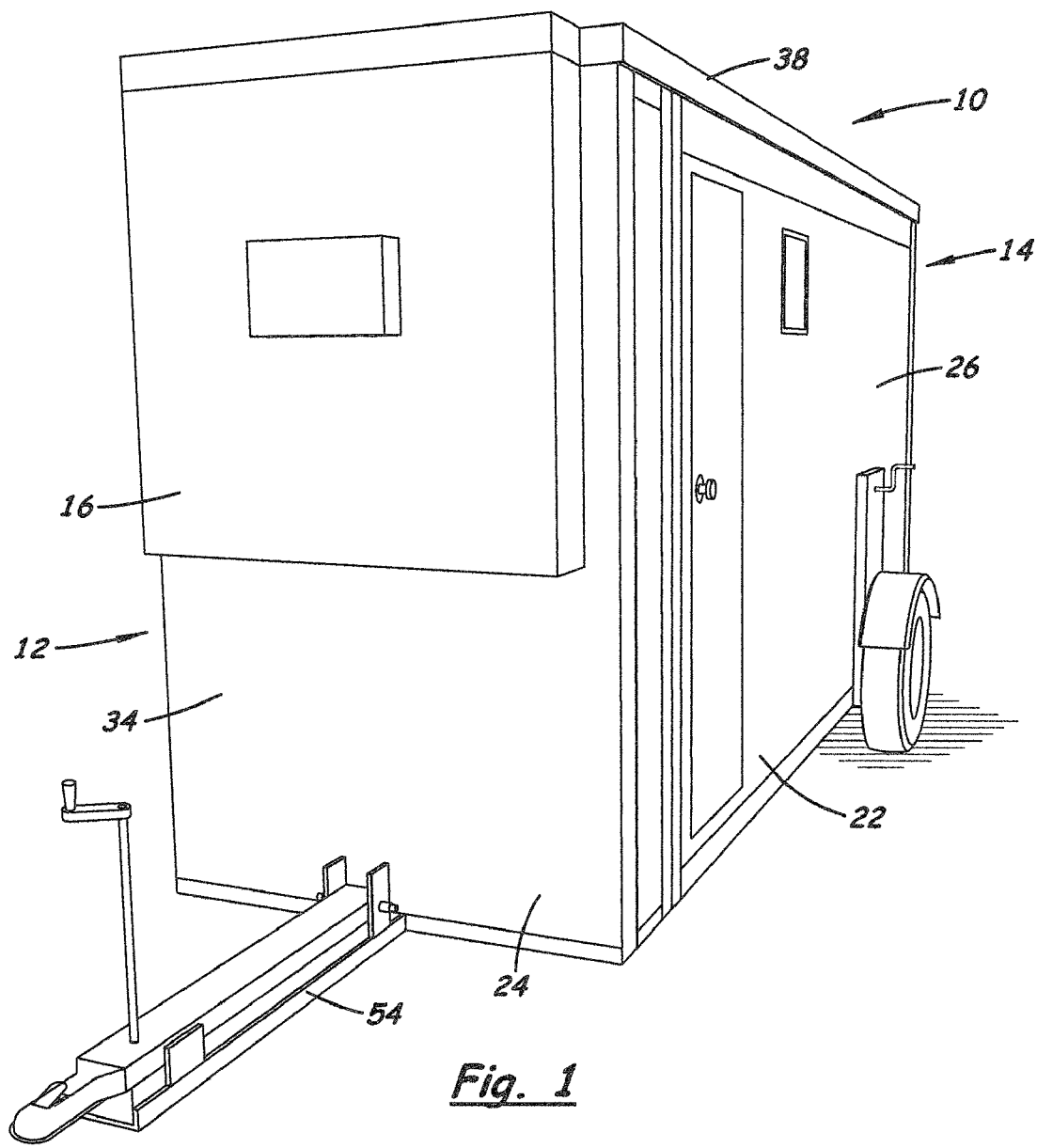
FIG. 1 is a schematic perspective view of a new trailer with adjustable interior size and adjustable track according to the present disclosure and shows the lateral enclosure portions and lateral frame portions in the contracted condition with the support frame in the raised position.
Figure 2:
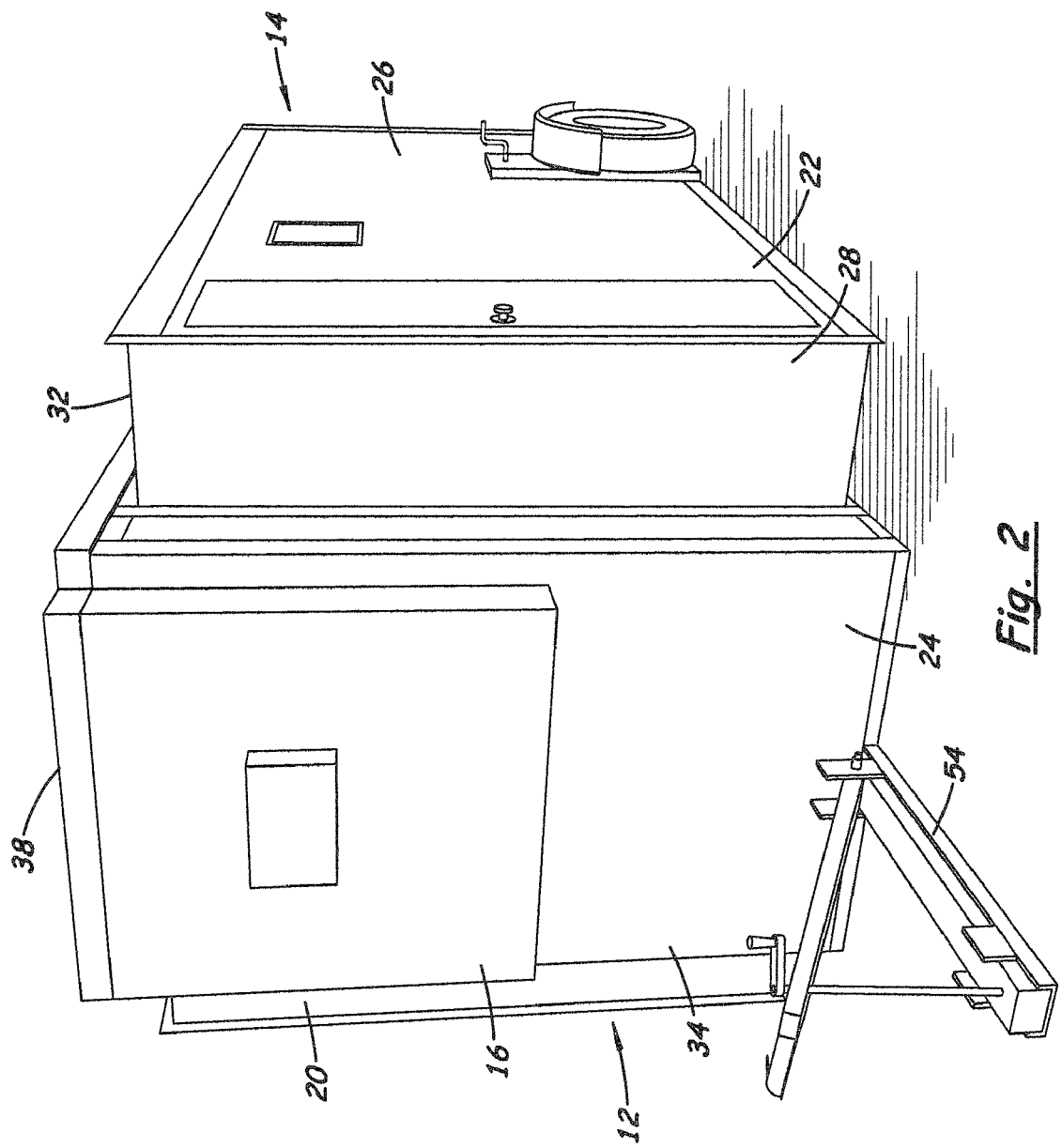
FIG. 2 is a schematic perspective view of the trailer according to an illustrative embodiment and shows the lateral enclosure portions and lateral frame portions in the expended condition with the support frame in the lowered position.
Figure 3:
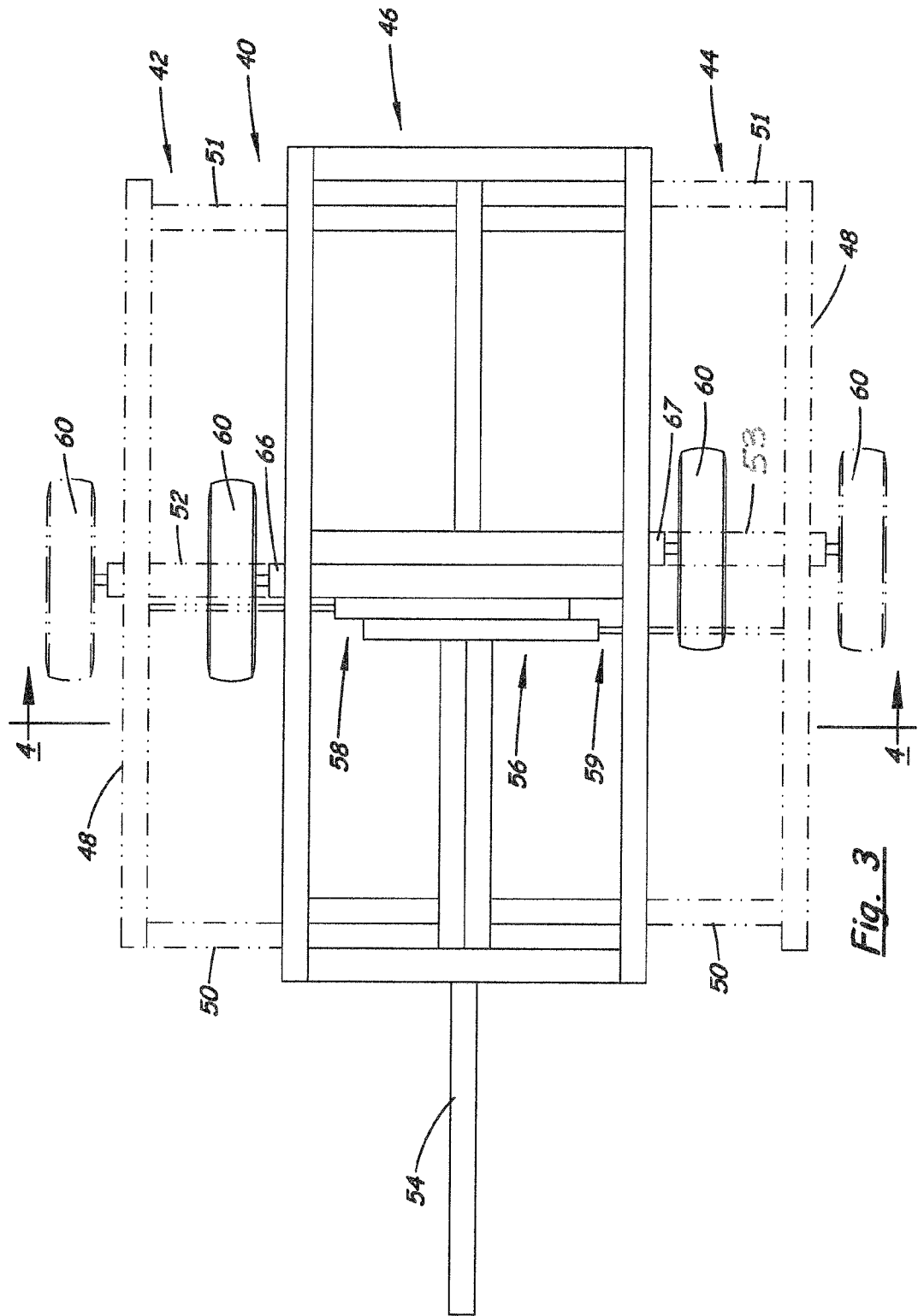
FIG. 3 is a schematic top view of the support frame of the trailer with portions of the enclosure removed to show the lateral frame portions in the contracted condition in solid lines and in the expanded condition in broken lines.
Figure 4:
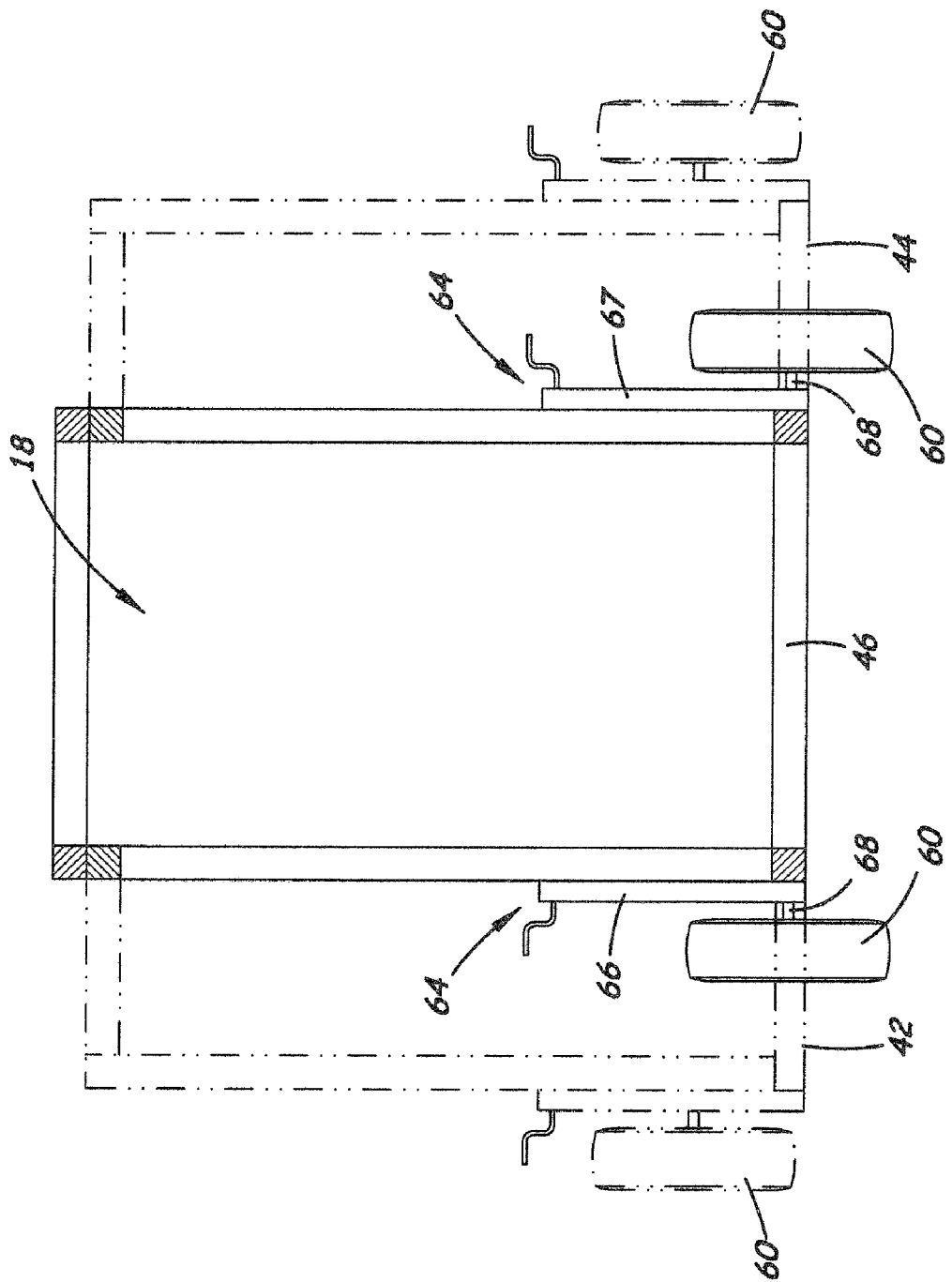
FIG. 4 is a schematic front view of a section of the support frame of the trailer (taken along line 4-4 of FIG. 3) with portions of the enclosure removed to show the lateral frame portions in the contracted condition in solid lines and in the expanded condition in broken lines, and to show the support frame in the wheels in the raised position in solid lines and in the lowered position in broken lines.
Figure 5:
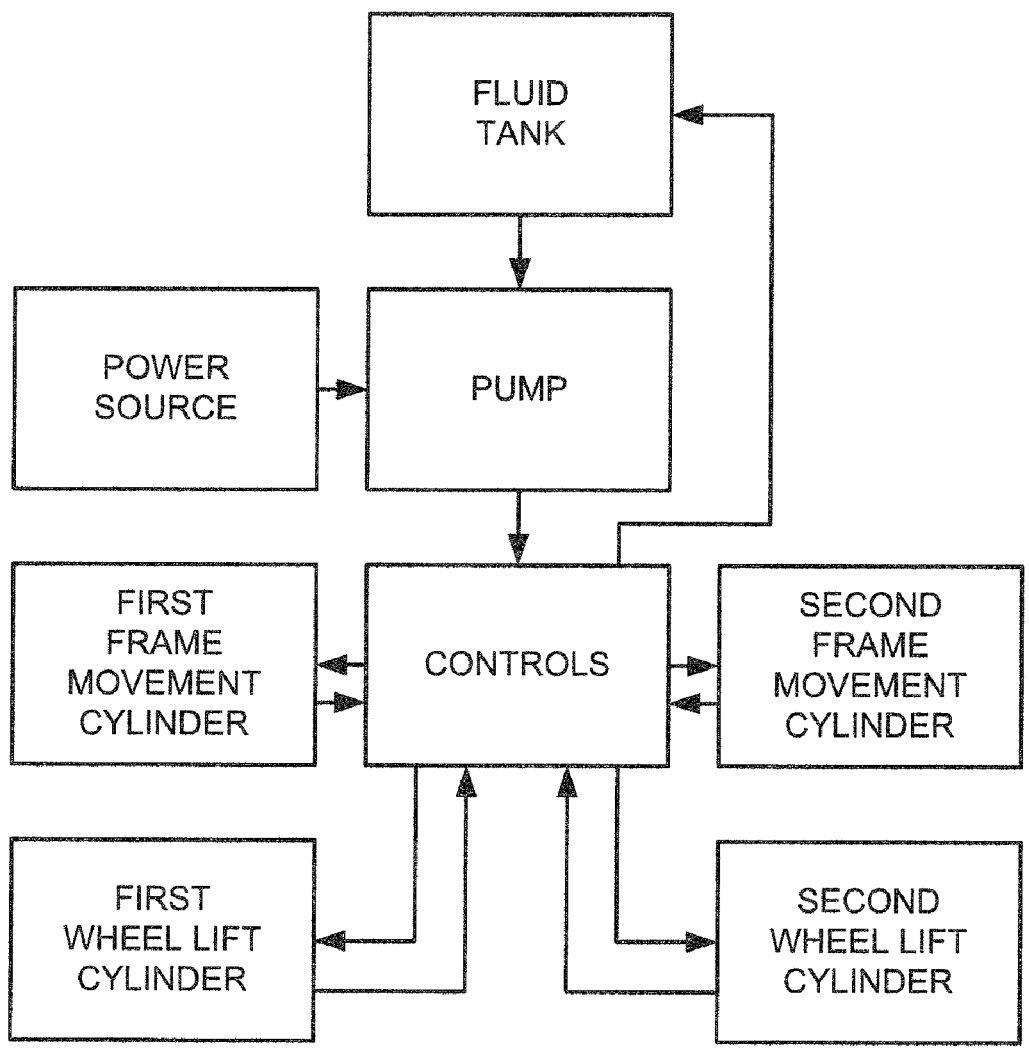
FIG. 5 is a schematic diagram of a control circuit suitable for actuating movement elements of the trailer.

With reference now to the drawings, and in particular to FIGS. 1 through 5 thereof, a new trailer with adjustable interior size and adjustable track embodying the principles and concepts of the disclosed subject matter will be described.

An enclosed trailer 10 of the disclosure is generally configured to be pulled or trailed behind a vehicle. The enclosed trailer of the disclosure is highly suitable for use as an ice fishing shack or but that is easily and conveniently transportable by towing behind a vehicle. The applicant has recognized that a trailer that is able to be expanded for use but contracted for transport is advantageous, especially when combined with the capability to raise and lower the trailer to contact the ground when being used for, for example, ice fishing, among other activities.

In general, the trailer 10 may include an enclosure 16, a support frame 40 which generally supports the enclosure, and wheels 60 that support the frame and enclosure on the ground surface. The trailer 10 may generally have a front 12 and a rear 14 which reflects the orientation of the trailer when the trailer is being pulled behind a vehicle.

In most embodiments, the trailer includes an enclosure 16 which substantially encloses and defines an interior space 18 for the trailer. The enclosure 16 may include at least two enclosure portions, which in most embodiments includes two lateral enclosure portions 20, 22 that may each define a portion of the interior 16 and may be positioned in a substantially opposed relationship to each other. The lateral enclosure portions 20, 22 may be laterally or sideways movable between a contracted condition (see FIG. 1) and an expanded condition (see FIG. 2). Generally, the interior 18 of the enclosure 12 has a relatively larger volume in the expanded condition and a relatively smaller volume in the contracted condition, such that moving the enclosure portions 20, 22 from the contracted condition to the expanded condition increases the enclosed volume of the interior 18, and moving the enclosure portions 20, 22 from the expended condition to the contracted condition decreases the volume of the interior. It should be recognized that while the illustrative embodiments of the enclosure show a telescopic relationship of the lateral enclosure portions with respect to the central enclosure portion, other configurations, such as embodiments in which the lateral enclosure portions have a clamshell arrangement with no central enclosure portion, may be utilized.

In some of the most preferred embodiments, the enclosure portions further include a central enclosure portion 24, and the two lateral enclosure portions are movable outwardly and inwardly with respect to the central enclosure portion. Preferably, the enclosure portions maintain enclosure and substantial encapsulation of the interior in the contracted and expanded conditions, as well as the positions of the portions 20, 22 as the portions move between the conditions. In the illustrative embodiments, each of the lateral enclosure portions 20, 22 includes a lateral side wall section 26, a forward wall section 28, a rearward wall section, and a roof section 32. Each of the lateral enclosure portions may include a floor section as well. The central enclosure portion 24 may include a forward wall section 34 and a rearward wall section, as well as a roof wall section 38. Optionally, a door may be located in one or more of the wall sections. The central enclosure portion may also include a floor, and the floor may be integrated into the support frame 40. Some or all of the sections of the lateral enclosure portions may be slid into the central enclosure portion when moved into the contracted condition.

The trailer 10 may also include a support frame 40 for supporting the enclosure 16 and the portions of the enclosure. The support frame 40 may include at least two lateral frame portions 42, 44, each of which may be associated with and employed to support one of the lateral enclosure portions 20, 22. The lateral frame portions 42, 44 may be laterally movable between a contracted condition (see FIGS. 3 and 4) and an expanded condition (see FIGS. 3 and 4). The contracted condition of the lateral frame portions 42, 44 may correspond to the contracted condition of the lateral enclosure portions 20, 22, and the expanded condition of the lateral frame portions may correspond to the expanded condition of the lateral enclosure portions. The support frame 40 may also include a central frame portion 46, which may be associated with and used to support the central enclosure portion. The lateral frame portions 42, 44 may be mounted on the central frame portion 46, with each of the lateral frame portions being laterally movable outwardly from the central frame portion.

Each of the lateral frame portions 42, 44 may include a lateral member 48 extending along a lateral side of the lateral frame portion, a forward member 50 positioned toward the front of the trailer and extending inwardly from the lateral member, a rearward member 51 positioned toward the rear of the trailer and extending inwardly from the lateral member. The forward and rearward members, as well any other members of the lateral frame portions that extend from the central frame portion out to the lateral member, may each be telescopically mounted in a corresponding tubular member of the central frame portion such that the members of the lateral frame portion slide inwardly and outwardly with respect to the tubular members of the central frame portion. Other configurations may also be employed.

The support frame 40 may also include a tongue portion 54 which may have a hitch for removably hitching the trailer 10 to a towing vehicle. The tongue portion 54 may be mounted on the central frame portion 46, and may be pivotable between a tow position (see FIG. 1) and a drop position (see FIG. 2). In the tow position, the tongue portion may be suitably oriented for the trailer being towed by the towing vehicle, and may be oriented substantially parallel to the plane of the central frame portion. In the drop position, the tongue portion (or a section thereof) may be oriented such that the central and lateral frame portions may be lowered from the normal towing height to a position closer to the ground surface. In the illustrative embodiments, a section of the tongue portion 54 may be pivoted upwardly from the orientation of the tow position such that the tongue portion is able to extend from the lowered central frame portion to the hitch of the towing vehicle spaced upwardly from the ground surface. The movable character of the tongue portion may thus permit the support frame and enclosure to be moved downwardly from a towing orientation to a position adjacent to the ground surface without having to disconnect the tongue portion of the trailer from the hitch of the towing vehicle.

The trailer 10 may also include a frame movement assembly 56 that is configured to move the portions of the support frame between the expanded and contracted condition, which also moves the lateral enclosure portions between the expanded and contracted conditions. More specifically, the frame movement assembly 56 may be configured to move the lateral frame portions outwardly and inwardly with respect to the central frame portion. The frame movement assembly 56 may be mounted on the central frame portion and may be linked or connected to the lateral frame portions to push the frame portions 20, 22 outwardly toward the expanded condition and pull the frame portions inwardly toward the contracted condition, and thereby moving the associated lateral enclosure portions between the corresponding conditions.

In the illustrative embodiments, the frame movement assembly 56 may comprise axle members 52, 53 that are laterally extendable and laterally retractable with respect to the center of the support frame 46 generally, and also with respect to the central frame portion when employed. The axle members 52, 53 may be telescopically mounted on tubes that form a part of the central frame portion to guide the movement of the members 52, 53. Outer ends may be connected to the lateral frame portions so that extension and retraction of the axle members tends to move the frame portions, including the lateral members. The frame movement assembly 56 may also comprise movement elements 58, 59 that are extendable and retractable to move the axle members as well as the lateral frame portions. The movement elements may be connected on one end to the central frame portion. The opposite end of the movement elements may be connected directly to one of the axle members to cause movement of the respective axle member, but illustratively is connected to one of the lateral frame portions, such that extension of the movement element pushes the lateral frame portion outward with respect to the central frame portion, and retraction of the movement element pulls the lateral frame portions inward with respect to the central frame portion. In the illustrative embodiment, the extension and retraction of the movement elements may extend and retract the axle members by virtue of the connection of the axle members to the lateral members. Each of the movement elements 58, 59 may comprise a piston/rod and cylinder structure that are either hydraulically or pneumatically actuated, as well as motor driven linear actuators. One end of the piston/rod and cylinder structure may be mounted on the central frame portion and another end of the piston/rod and cylinder structure may be mounted on, for example, the lateral member 48 of one of the lateral frame portions.

The trailer may also include a pair of wheels 60 that are configured to support the support frame 40 and the enclosure 16 above the ground surface, such as when the trailer is being towed down the road. In some of the most preferred embodiments, the wheels 60 are moved laterally outward when the support frame moves from the contracted condition to the expanded condition, and are moved laterally inward when the support frame moves from the expanded condition to the contracted condition. To achieve this movement, the wheels may be mounted on the support frame 40, with each of the wheels being mounted on one of the lateral frame portions 42, 44 such that the wheels move with the frame portions. Each of the wheels may be mounted on one of the support frame portions toward a lateral side of the lateral member 48 of the support frame. It will be recognized that the movement of the wheels with the frame and enclosure portions serves to change the width of the track of the trailer.

The trailer 10 may also include a wheel movement assembly 64 that is configured to adjust the height, or spacing between the support frame and a ground surface on which the wheels rest, for the vehicle. The wheel movement assembly 64 may be configured to adjust the vertical position of the wheels 60 with respect to the support frame, and the support frame may be moved between a raised position suitable for towing the trailer over the road and a lowered position suitable for resting the support frame on the ground surface, or at least bringing the support frame closer to the ground surface. In the some of the illustrative embodiments, the wheel movement assembly 64 comprises a pair of wheel jack structures 66, 67, with each of the jack structures being associated with one of the wheels. Each of the wheel jack structures may be positioned between the wheel (on a stub axle) and the support frame 40, and more specifically one of the axle members, so that the wheel jack structure is able to act on one of the wheel and change its position with respect to the support frame. Illustratively, each of the wheel jacks may be mounted on one of the axle members 52, 53 such that the wheel jacks move laterally inwardly and outwardly with the axle members and the lateral frame portions. The wheel jack structures may move the stub axles 68 in a vertical direction to move the wheels mounted on the stub axles. In some embodiments, each of the wheel jack structures may be manually actuated or adjusted, and each jack structure may have an actuating crank that is rotated to cause extension and retraction of a jack leg with respect to a jack tube. Illustratively, the stub axle 68 may be mounted on the jack tube and the jack leg may be mounted on the lateral member of the lateral frame portion, although it will be recognized that other arrangements may be utilized. Optionally, a piston/rod and cylinder structure may be used to move the wheels between the vertical positions of the wheels.

In operation, the wheels may be raised, and the support frame correspondingly lowered, before the enclosure and support frame is moved from the contracted condition to the expanded condition. When the support frame is lowered, the frame may primarily rest upon the central frame portion to allow the lateral frame portions to move outwardly and inwardly, although this is not critical. The capability to change the position of the ground contacting wheels with respect to the support frame, and thus the height of the support frame above the ground surface, is significant because the bottom of the support frame may be brought closer to, and in some preferred case into contact with, the ground surface so that the support frame (as well as the enclosure) rests upon the ground surface. In the most preferred embodiments, substantially the entire floor area of the enclosure is able to be lowered to the level of the ground, and the presence of the wheels does not impinge on and reduce the floor area. When used for ice fishing, the support frame may thus be brought into contact with the ice on the body of water, and the broad floor area on the support frame is available to be opened to access a hole formed in the ice for ice fishing. When the ice fishing activity is completed, and it is desired to tow the trailer off of the ice-covered body of water, then the wheels may be moved downwardly with respect to the support frame, thus raising the support frame with respect to the ground and placing the trailer in a more favorable towing configuration.

Adjustment of the track of the trailer may be highly useful for meeting legal width restrictions when pulling the trailer down the road, but then maximizing the interior volume of the trailer when the trailer is stationary. Adjustment of the track to more closely match the track of the towing vehicle can also have the benefit of permitting the wheels of the trailer to follow in the "tracks" or groves formed by the towing vehicle in snow, which can significantly ease the pulling of the trailer through deep snow that might be encountered on, or on the way to, a frozen lake The ability to expand the available floor area of the trailer when the trailer is stationary permits greater access to, for example, ice located below the trailer when the trailer is utilized for ice fishing, as well as simply giving the interior more room for the occupants to move around in. User movement, and ice fishing activity, in the interior is thus not limited to a small footprint dictated by wheels that are positioned at a track width configured for legal highway travel. Further, the trailer, when the enclosure in the contracted condition, has a relatively smaller frontal cross sectional area which is likely to present less wind resistance when being towed on a road at higher speeds, which can reduce the amount of power (and thus fuel consumption) necessary to pull the trailer on the road.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An enclosed trailer having a front and a rear, the trailer comprising:
    an enclosure having an interior at least partially defined by at least two lateral enclosure portions, the lateral enclosure portions being laterally movable between a contracted condition with a relatively smaller interior volume and an expanded condition with a relatively larger interior volume;
    a support frame including at least two lateral frame portions, the lateral frame portions being laterally movable between a contracted condition and an expanded condition, the contracted condition of the lateral frame portions corresponding to the contracted condition of the lateral enclosure portions and the expanded condition of the lateral frame portions corresponding to the expanded condition of the lateral enclosure portions;
    a frame movement assembly configured to move the lateral frame portions of the support frame between the expanded and contracted conditions, the frame movement assembly including a pair of laterally extendable and retractable axle members; and
    a pair of wheels with each of the wheels being mounted on one of the axle members such that the wheels move laterally inward and outward with the frame portions as the frame portions are moved laterally inward and outward between the contracted and expanded conditions by the frame movement assembly.

2. The trailer of claim 1 further comprising a wheel movement assembly configured to adjust a spacing between the support frame and a ground surface on which the wheels rest such that the support frame is positionable on the ground surface and raisable to be spaced above the ground surface.

3. The trailer of claim 2 wherein the wheel movement assembly is configured to adjust a vertical position of the wheels with respect to the support frame.

4. The trailer of claim 2 wherein each of the wheels is mounted on a stub axle, and
    wherein the wheel movement assembly comprises a pair of wheel jack structures, each of the wheel jack structures being configured to change a vertical position of one of the stub axles supporting a wheel with respect to one of the lateral frame portions.

5. The trailer of claim 1 wherein each of the wheels is mounted on one of the support frame portions toward a lateral side of the lateral frame portion.

6. The trailer of claim 1 wherein lateral movement of the lateral frame portions changes a track characteristic of the wheels.

7. The trailer of claim 6 wherein movement of the axle members toward the expanded condition causes an increase in the track characteristic of the wheels and movement of the axle members toward the contracted condition causes a decrease in the track characteristic of the wheels.

8. The trailer of claim 1 wherein the support frame includes a tongue portion pivotable between a tow position in which the tongue portion is oriented for being towed by a towing vehicle and a drop position in which the tongue portion is oriented to maintain hitching to the towing vehicle when the support frame is lowered to be proximate to the ground surface.

9. The trailer of claim 1 wherein the enclosure further comprises a central enclosure portion, each of the lateral enclosure portions being laterally movable outwardly with respect to the central enclosure portion.

10. The trailer of claim 9 wherein the support frame includes a central frame portion associated with the central enclosure portion.

11. The trailer of claim 1 wherein the support frame includes a central frame portion, the lateral frame portions being mounted on the central frame portion and being laterally movable outwardly from the central frame portion.

12. The trailer of claim 1 wherein the frame movement assembly is mounted on the lateral frame portions to push the frame portions outward toward the expanded condition and pull the frame portions inward toward the contracted condition.

13. The trailer of claim 11 wherein the axle members of the frame movement assembly are configured to push the frame portions outwardly away from the central frame portion and pull the frame portions inwardly toward the central frame portion.

14. The trailer of claim 1 wherein the frame movement assembly comprises movement elements that are extendable and retractable to move the axle members.

15. An enclosed trailer having a front and a rear, the trailer comprising:
    an enclosure having an interior at least partially defined by a central enclosure portion and at least two lateral enclosure portions laterally movable outwardly with respect to the central enclosure portion, the lateral enclosure portions being laterally movable between a contracted condition with a relatively smaller interior volume and an expanded condition with a relatively larger interior volume;
    a support frame including a central frame portion and at least two lateral frame portions laterally movable outwardly from the central frame portion, the lateral frame portions being movable between a contracted condition and an expanded condition, the contracted condition of the lateral frame portions corresponding to the contracted condition of the lateral enclosure portions and the expanded condition of the lateral frame portions corresponding to the expanded condition of the lateral enclosure portions;
    a frame movement assembly configured to move the lateral frame portions of the support frame between the expanded and contracted conditions, the frame movement assembly including a pair of laterally extendable and retractable axle members; and
    a pair of wheels with each of the wheels being mounted on one of the axle members such that the wheels move laterally inward and outward with the frame portions as the frame portions move laterally inward and outward between the contracted and expanded conditions by the frame movement assembly; and a wheel movement assembly configured to adjust a spacing between the support frame and a ground surface on which the wheels rest such that the support frame is positionable on the ground surface and raisable to be spaced above the ground surface.

16. The trailer of claim 15 wherein the wheel movement assembly moves the pair of wheels along a substantially straight vertical path in adjusting the spacing between the support frame and the ground surface.

17. The trailer of claim 1 wherein the wheels move in a substantially straight lateral path when the lateral frame portions are moved laterally between the expanded and contracted conditions.

18. The trailer of claim 1 wherein the contracted condition of the lateral frame portions of the support frame comprises a configuration with a lateral track width towable on a road.

19. The trailer of claim 2 wherein the wheel movement assembly moves the pair of wheels along a substantially straight vertical path in adjusting the spacing between the support frame and the ground surface.

* * * * *